J. ROTHCHILD.
ENGINE VALVE.
APPLICATION FILED MAY 1, 1909.
979,097.
Patented Dec. 20, 1910.
2 SHEETS—SHEET 1.
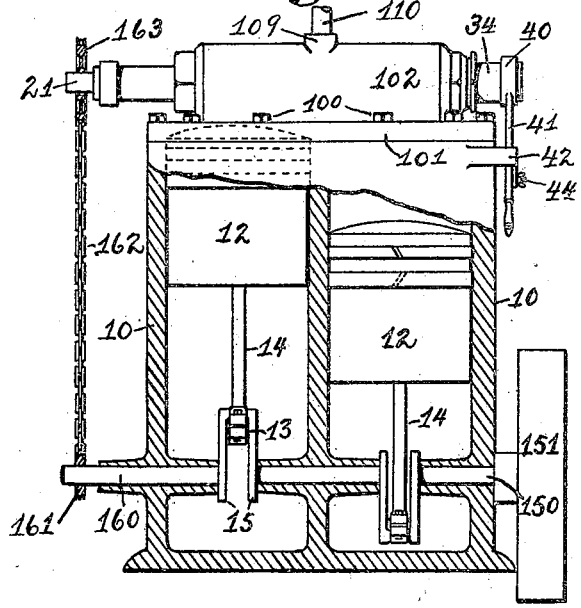
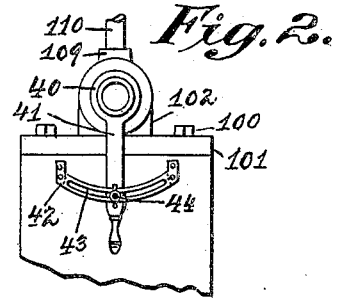
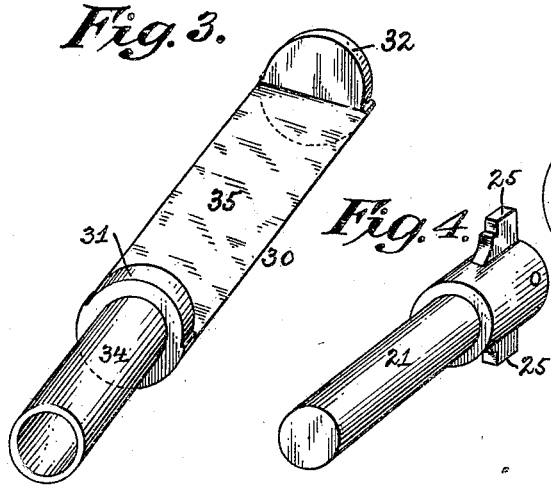
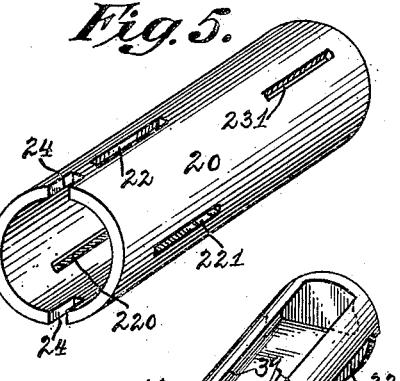
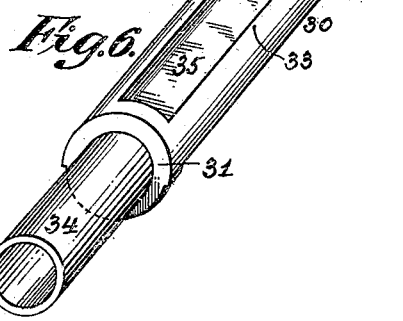
Attest:
May Hughes
Alan C. McDonnell
Joseph Rothchild, Inventor:
by William R. Baird
his Att'y.

J. ROTHCHILD.
ENGINE VALVE.
APPLICATION FILED MAY 1, 1909.
979,097.
Patented Dec. 20, 1910.
2 SHEETS—SHEET 2.
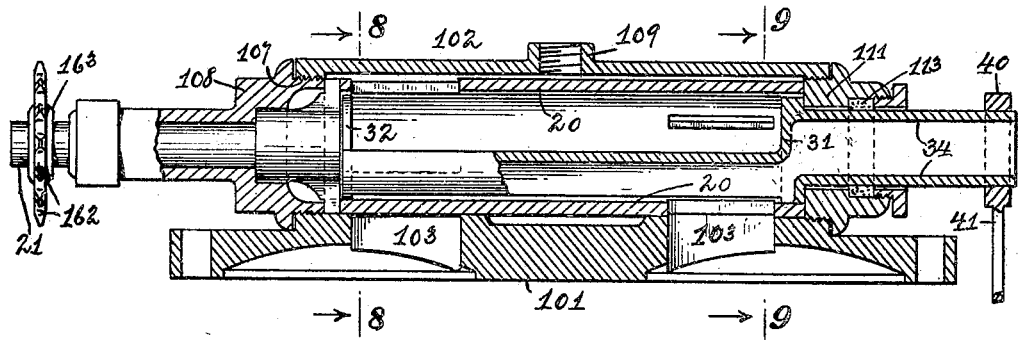
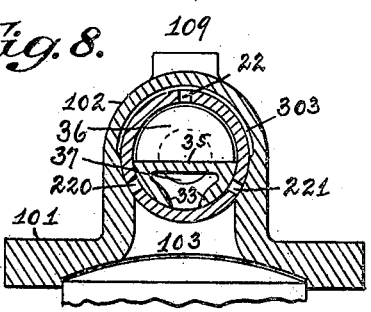
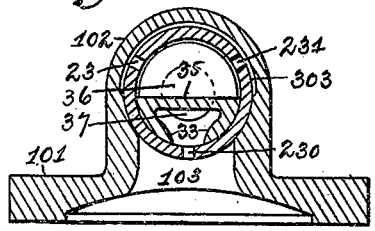
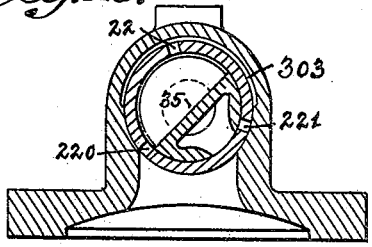
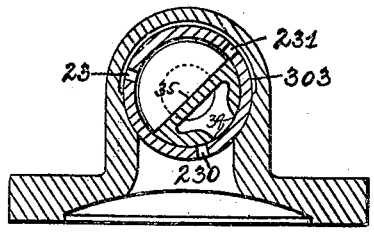
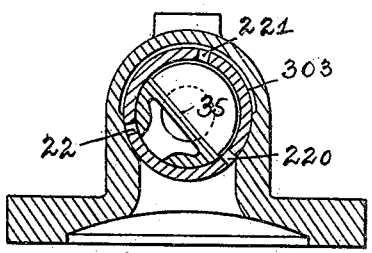
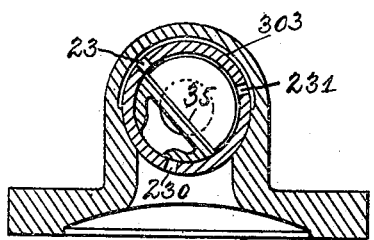
Attest:
May Hughes
Alan C. McDonnell
Inventor:
Joseph Rothchild,
by William R. Baird
his Atty.

UNITED STATES PATENT OFFICE.

JOSEPH ROTHCHILD, OF NEW YORK, N. Y.

ENGINE-VALVE.

979,097.     Specification of Letters Patent.     Patented Dec. 20, 1910.

Application filed May 1, 1909. Serial No. 493,264.

*To all whom it may concern:*

Be it known that I, JOSEPH ROTHCHILD, a citizen of the United States, and resident of the borough of the Bronx, in the city, county, and State of New York, have invented certain new and useful Improvements in Engine-Valves, of which the following is a specification.

This invention relates to engines adapted to be used with steam or similar expansible gas and its novelty consists in the construction and adaptation of the valves and their related parts.

In the drawings, Figure 1 is a side elevation and partial vertical section of an engine provided with two cylinders embodying the invention; Fig. 2 is a side view of the upper part of the engine and valve casing; Fig. 3 is a perspective of the adjuster showing its upper side; Fig. 4 is a perspective of the valve stem; Fig. 5 is a perspective of the valve; Fig. 6 is a perspective of the adjuster showing its lower side; Fig. 7 is a vertical longitudinal section through the valve casing; Figs. 8 and 9 are transverse vertical sections on the planes of the lines 8—8 and 9—9 respectively in Fig. 7 showing the adjuster in a horizontal position, and the engine inoperative, as no steam can enter the cylinder; Figs. 10 and 11 are similar views showing the adjuster in position to allow the pistons to drive the shaft in one direction and Figs. 12 and 13 are similar views showing the adjuster in the opposite position to allow the pistons to drive the shaft in the reverse direction.

In the drawings, 10, 10 represent the cylinders of the engine of which there are two, side by side. In each cylinder a piston 12 is adapted to reciprocate. Each piston is provided with a wrist pin 13, a connecting rod 14 and cranks 15, 15, whereby they are coupled to and actuate shafts 150 and 160 adapted to rotate in suitable bearings in the usual manner. A fly wheel 151 is secured to the shaft 150, and a sprocket wheel 161 is secured to the shaft 160. This sprocket wheel engages a sprocket chain 162 which in turn communicates motion to a sprocket wheel 163 of three times the diameter of the wheel 161, which wheel 163 is mounted on the projecting rotatable stem 21 of a valve 20 located above the cylinders 10 of the engine.

Secured above the cylinders by any suitable means, for instance bolts 100, there is provided a double cylinder head 101 provided with an upwardly extending housing 102 forming a valve casing. This is provided with two passageways 103, each leading to one of the cylinders 10 above the piston. The housing 102 is internally threaded at 107 to receive a hollow bearing 108 in which the valve stem 21 is adapted to rotate. It is also provided with a threaded nipple 109 to receive a steam inlet pipe 110 and it is provided with a separable annular bearing 111 in which an adjuster 30, about to be described, is supported and in which it is adapted to be turned. A packing indicated at 113 serves to prevent leakage at that point.

The valve 20 is made in the form of a cylinder, is adapted to fit snugly within the casing 102 and is provided with two series of ports comprising longitudinal openings in the body of the cylinder. There are three ports exactly alike in effective area in each series, one set 22, 220 and 221 adapted to communicate with the left cylinder and a similar set 23, 230 and 231 adapted to communicate with the right cylinder. The ports of one series are circularly staggered with respect to those of the other series. The distance circularly measured around the body of the cylinder from one port to the next in either series is equal to the width of the passageway 103 similarly measured. The valve is also provided with two notches 24 diametrically arranged which are adapted to be engaged by fins 25 projecting from the valve stem 21, so that while the valve 20 and its stem are not secured together nevertheless the valve will be rotated by the rotation of the stem. The valve is seated against the inner surface of the casing and it will be noted that the seating surfaces are longitudinal segments of the inner side of the casing commencing on each side of the conduit or passageway 103 and terminating below a horizontal plane passing through the center of rotation of the valve. Above the seating surface is a clearance indicated at 303.

The adjuster 30, above referred to, is of peculiar form. It comprises a long flat member 35 provided at one end with a substantially circular disk 31, and at the other end with a similar disk 32, which disks are adapted to fit within the valve 20. A tube or cylinder 34 projects outwardly from the disk 32 and is adapted to turn in the bearing 111. Between the disks 31 and 32 and beneath the member 35 and made integral with it are two inwardly turned flanges 33 having external cylindrical surfaces between which is an interruption 39, forming a passage for the exhaust steam discharged from the engine cylinder. These flanges are adapted to fit closely against the inner walls of the valve 20. The space between the upper surface of the member 35 and the inner surface of the valve 20 is indicated by 36 and the space beneath the member 35 by 37. It will be noted that the member 35 which may be called the diaphragm of the adjuster, is less in width than the internal diameter of the valve 20, so that when it is in position (as shown in Figs. 8 to 13) it does not fill one half of the interior of the valve. It will also be noted that the width of the interruption 39 is greater than the width of any of the ports of the rotary valve but less than the width of the conduit 103.

At any convenient point on the cylinder 34 there is secured a collar 40 terminating in a handle 41. A curved bracket 42 having a segmental slot 43 is secured at any convenient point on the casing of the engine near the handle and the latter is provided with a threaded pin 44 adapted to project through the slot 43 and carrying on the outside of the bracket a wing nut by which it can be secured in position. By this means the adjuster 30 may be circularly adjusted with respect to the valve 20 and is securely held in place after such adjustment.

When the adjuster is in the position shown in Figs. 8 and 9, it is evident that the valve, if rotated, will accomplish no useful purpose because the steam entering the interior of the valve in the space 36 cannot get out past the adjuster. If the adjuster is turned to the position shown in Figs. 10 and 11 in which the lower left hand edge of the diaphragm 35 is so placed that the port 220 just covers the distance between such diaphragm and the edge of the casing opposite thereto, then as the steam can pass freely through the full width of this port, when the valve is in the position indicated, the port is as open as it can be. Each time in the rotation of the valve that one of its ports comes around to the position indicated in Fig. 10, a full supply of steam will enter the conduit 103 and the engine cylinder, and obviously this will occur three times for one revolution of such valve because it has the three ports arranged equidistant from one another.

As soon as the port has passed the edge of the diaphragm, steam ceases to enter through it and the valve is closed, and remains closed until the port is opposite the interruption 39 in the adjuster. As soon as that occurs the steam from the engine cylinder can pass to the space within the adjuster beneath the diaphragm and will be discharged, and this outlet is open so long as the port is passing the interruption 39 and is not cut off by the right hand valve seat of the casing.

It is quite obvious that if the adjuster is moved from its position, shown in Fig. 10, slightly toward the left, it will, of course, throttle the valve to that extent and may be moved to entirely close it, but it will not affect the freedom of the discharge of the steam as the valve port passes by the interruption 39.

As the ports of that part of the valve serving the right cylinder are staggered with respect to those of the valve serving the left cylinder, as indicated in Fig. 5 and in Figs. 10 and 11, the entrance into and exhausting of the steam from the left cylinder controlled by any active position of the adjuster, will alternate with the similar movement of the steam into and out of the right cylinder while controlled by the same position of the adjuster. Assuming that the position of the adjuster shown in Figs. 10 and 11 coincides with full speed ahead for the engine, a position of the adjuster at right angles thereto, as shown in Figs. 12 and 13, would coincide with full speed backward. And it can readily be understood that as the position of the adjuster is varied the movement backward or forward of the engine at any speed is readily controlled.

It will be observed that the flat diaphragm 35 is slightly less in diameter than the interior of the valve. Now, when the steam passes into the valve and between it and this diaphragm 35, it exerts a pressure downward upon the diaphragm which causes the adjuster to seat very closely and firmly against the inside of the valve, so that the adjuster is automatically tightened, although the valve will not stick. The steam passes into the clearance 303 (Fig. 8) and between the casing and the valve and presses the valve downward against its seat so that the revolving valve is seated automatically and yet does not stick. This construction is of extreme value in the device being very effective for its purpose.

What I claim as new is:—

1. A valve mechanism for a steam engine adapted to govern the entrance and exit of the steam from conduits leading to a plurality of adjacent steam cylinders, comprising a casing, having an opening in its periphery to receive live steam, a hollow rotary valve cylinder, having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, the ports for each conduit being arranged in a series and spaced equidistant from each other around the valve cylinder.

2. A valve mechanism for a steam engine adapted to govern the entrance and exit of the steam from conduits leading to a plurality of adjacent steam cylinders, comprising a casing having an opening in its periphery to receive live steam, a hollow rotary valve cylinder having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, the ports for one conduit being staggered with respect to those of each adjacent conduit.

3. A valve mechanism for a steam engine adapted to govern the entrance and exit of the steam from conduits leading to a plurality of adjacent steam cylinders, comprising a casing having an opening in its periphery to receive live steam, a hollow rotary valve cylinder having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, the ports for each conduit being arranged in a series and spaced equidistant from each other around the valve cylinder, and the ports for one conduit being staggered with respect to those of each adjacent conduit.

4. A valve mechanism for a steam engine adapted to govern the entrance and exit of the steam from conduits leading to a plurality of adjacent steam cylinders, comprising a casing having an opening in its periphery to receive live steam, a hollow rotary valve cylinder, having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, in combination with an internal controller adapted to throttle the ports on the inside of the valve cylinder.

5. A valve mechanism for a steam engine adapted to govern the entrance and exit of the steam from conduits leading to a plurality of adjacent steam cylinders, comprising a casing, having an opening in its periphery to receive live steam, a hollow rotary valve cylinder having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, the ports for each conduit being arranged in a series and spaced equidistant from each other around the valve cylinder, in combination with an internal controller adapted to throttle the ports on the inside of the valve cylinder.

6. A valve mechanism for a steam engine adapted to govern the entrance and exit of the steam from conduits leading to a plurality of adjacent steam cylinders, comprising a casing having an opening in its periphery to receive live steam, a hollow rotary valve cylinder having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, the ports for one conduit being staggered with respect to those of each adjacent conduit, in combination with an internal controller adapted to throttle the ports on the inside of the valve cylinder.

7. A valve mechanism for a steam engine adapted to govern the entrance and exit of the steam from conduits leading to a plurality of adjacent steam cylinders, comprising a casing, having an opening in its periphery to receive live steam, a hollow rotary valve cylinder, having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, the ports for each conduit being arranged in a series and spaced equidistant from each other around the valve cylinder, and the ports for one conduit being staggered with respect to those of each adjacent conduit, in combination with an internal controller adapted to throttle the ports on the inside of the valve cylinder.

8. A valve mechanism for a steam engine adapted to govern the entrance and exit of the steam from conduits leading to a plurality of adjacent steam cylinders, comprising a casing having an opening in its periphery to receive live steam, a hollow rotary valve cylinder having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, in combination with an internal controller adapted to throttle the ports on the inside of the valve cylinder, and means for circularly moving the controller.

9. A valve mechanism for a steam engine adapted to govern the entrance and exit of the steam from conduits leading to a plurality of adjacent steam cylinders, comprising a casing having an opening in its periphery to receive live steam, a hollow rotary valve cylinder, having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, the ports for each conduit being arranged in a series and spaced equidistant from each other around the valve cylinder, in combination with an internal controller adapted to throttle the ports on the inside of the valve cylinder, and means for circularly moving the controller.

10. A valve mechanism for a steam engine adapted to govern the entrance and exit of the steam from conduits leading to a plurality of adjacent steam cylinders, comprising a casing having an opening in its periphery to receive live steam, a hollow rotary valve cylinder having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, the ports for one conduit being staggered with respect to those of each adjacent conduit, in combination with an internal controller adapted to throttle the ports on the inside of the valve cylinder, and means for circularly moving the controller.

11. A valve mechanism for a steam engine adapted to govern the entrance and exit of the steam from conduits leading to a plurality of adjacent steam cylinders, comprising a casing, having an opening in its periphery to receive live steam, a hollow rotary valve cylinder, having a plurality of longitudinal ports adapted to admit live steam from the casing into the interior of the valve cylinder and from thence to the steam cylinder conduits when the cylinder is in one position and to admit exhaust steam from the steam cylinders into its interior and thence out of the end of the casing when in another position, the ports for each conduit being arranged in a series and spaced equidistant from each other around the valve cylinder, and the ports for one conduit being staggered with respect to those of each adjacent conduit, in combination with an internal controller adapted to throttle the ports on the inside of the valve cylinder and means for circularly moving the controller.

12. A rotary valve for a steam engine adapted to govern the entrance and exit of the steam from conduits leading to a plurality of adjacent cylinders and comprising a hollow cylindrical body provided with a plurality of longitudinal ports adapted to coöperate with each conduit, in combination with a controller within the valve comprising a substantially flat diaphragm on the inlet side of less width than the diameter of the valve and an opening on the outlet side of greater width than any one of the valve ports.

13. A rotary valve for a steam engine adapted to govern the entrance and exit of the steam from conduits leading to a plurality of adjacent cylinders and comprising a hollow cylindrical body provided with a plurality of longitudinal ports adapted to coöperate with each conduit, the ports for each conduit being arranged in a series and spaced equidistant around the cylinder, in combination with a controller within the valve comprising a substantially flat diaphragm on the inlet side of less width than the diameter of the valve and an opening on the outlet side of greater width than any one of the valve ports.

14. A rotary valve for a steam engine adapted to govern the entrance and exit of the steam from conduits leading to a plurality of adjacent cylinders and comprising a hollow cylindrical body provided with a plurality of longitudinal ports adapted to coöperate with each conduit, the ports for one conduit being staggered with respect to those of the adjacent conduit, in combination with a controller within the valve comprising a substantially flat diaphragm on the inlet side of less width than the diameter of the valve and an opening on the outlet side of greater width than any one of the valve ports.

15. A rotary valve for a steam engine adapted to govern the entrance and exit of the steam from conduits leading to a plurality of adjacent cylinders and comprising a hollow cylindrical body provided with a plurality of longitudinal ports adapted to coöperate with each conduit, the ports for one conduit being staggered with respect to those of the adjacent conduit, the ports for each conduit being arranged in a series and spaced equidistant around the cylinder.

16. Two engine cylinders arranged side by side, a piston adapted to reciprocate in each cylinder, a common steam inlet and outlet conduit for each engine cylinder, a casing common to both engine cylinders intermediate said conduits and a source of steam supply through the periphery of the casing, a rotary valve cylinder connected to and operated from a moving part of the engine and adapted to regulate both the admission and discharge of the steam simultaneously from both engine cylinders, being provided with a plurality of ports admitting steam from the casing to the interior of the valve cylinder and thence to the conduits in one position, and from the conduits to the interior of the valve cylinder and out the end thereof in another position, and means constituting a variable cut off for the steam on the inlet side and a uniform cut off for the steam on the outlet side.

17. Two engine cylinders arranged side by side, a piston adapted to reciprocate in each cylinder, a common steam inlet and outlet conduit for each engine cylinder, a casing common to both engine cylinders intermediate said conduits and a source of steam supply through the periphery of the casing, a rotary valve cylinder connected to and operated from a moving part of the engine and adapted to regulate both the admission and discharge of the steam simultaneously from both engine cylinders, being provided with a plurality of ports admitting steam from the casing to the interior of the valve cylinder and thence to the conduits in one position and from the conduits to the interior of the valve cylinder and out the end thereof in another position, the ports for each conduit being spaced equally distant from each other around the valve cylinder.

18. Two engine cylinders arranged side by side, a piston adapted to reciprocate in each cylinder, a common steam inlet and outlet conduit for each engine cylinder, a casing common to both engine cylinders intermediate said conduits and a source of steam supply through the periphery of the casing, a rotary valve cylinder connected to and operated from a moving part of the engine and adapted to regulate both the admission and discharge of the steam simultaneously from both engine cylinders, being provided with a plurality of ports admitting steam from the casing to the interior of the valve cylinder and thence to the conduits in one position, and from the conduits to the interior of the valve cylinder and out the end thereof in another position, the ports for each conduit being staggered with relation to those of each adjacent conduit.

19. Two engine cylinders arranged side by side, a piston adapted to reciprocate in each cylinder, a common steam inlet and outlet conduit for each engine cylinder, a casing common to both engine cylinders intermediate said conduits and a source of steam supply through the periphery of the casing, a rotary valve cylinder connected to and operated from a moving part of the engine and adapted to regulate both the admission and discharge of the steam simultaneously from both engine cylinders, being provided with a plurality of ports admitting steam from the casing to the interior of the valve cylinder and thence to the conduits in one position and from the conduits to the interior of the valve cylinder and out the end thereof in another position, the ports for each conduit being spaced equally distant from each other around the valve cylinder, and the ports for each conduit being staggered with relation to those of each adjacent conduit.

20. Two engine cylinders arranged side by side, a piston adapted to reciprocate in each cylinder, a common steam inlet and outlet conduit for each engine cylinder, a casing common to both engine cylinders intermediate said conduits and a source of steam supply through the periphery of the casing, a rotary valve cylinder connected to and operated from a moving part of the engine and adapted to regulate both the admission and discharge of the steam simultaneously from both engine cylinders, being provided with a plurality of ports admitting steam from the casing to the interior of the valve cylinder and thence to the conduits in one position and from the conduits to the interior of the valve cylinder and out the end thereof in another position, and means constituting a variable cut off for the steam on the inlet side and a uniform cut off for the steam on the outlet side, the ports for each conduit being staggered with relation to those of each adjacent conduit, and means constituting a variable cut off for the steam on the inlet side and a uniform cut off for the steam on the outlet side.

21. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder conduit, and means constituting a variable cut off for the steam on the inlet side and a uniform cut off for the steam on the outlet side, consisting of an internal flat diaphragm within the valve and means for circularly adjusting it.

22. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder spaced equally distant around the rotary valve, and means constituting a variable cut off for the steam on the inlet side and a uniform cut off for the steam on the outlet side, consisting of an internal diaphragm flat within the valve and means for circularly adjusting it.

23. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder conduit, the ports for one conduit being staggered with respect to those of the adjacent conduit and means constituting a variable cut off for the steam on the inlet side and a uniform cut off for the steam on the outlet side, consisting of an internal flat diaphragm within the valve and means for circularly adjusting it.

24. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder conduit, and means constituting a variable cut off for the steam on the inlet side and a uniform cut off for the steam on the outlet side, consisting of a hollow body within the valve and impervious to steam on the inlet side and free to receive and discharge it on the outlet side.

25. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder spaced equally distant around the rotary valve, and means constituting a variable cut off for the steam on the inlet side and a uniform cut off for the steam on the outlet side, consisting of a hollow body within the valve and impervious to steam on the inlet side and free to receive and discharge it on the outlet side.

26. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder conduit, the ports for one conduit being staggered with respect to those of the adjacent conduit and means constituting a variable cut off for the steam on the inlet side and a uniform cut off for the steam on the outlet side, consisting of a hollow body within the valve and impervious to steam on the inlet side and free to receive and discharge it on the outlet side.

27. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder conduit, and means constituting a variable cut off for the steam on the inlet side and a uniform cut off for the steam on the outlet side, consisting of a hollow body within the valve and impervious to steam on the inlet side and free to receive and discharge it on the outlet side and provided with means circularly adjusting it within the valve.

28. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder spaced equally distant around the rotary valve, and means constituting a variable cut off for the steam on the outlet side, consisting of a hollow body within the valve and impervious to steam on the inlet side and free to receive and discharge it on the outlet side and provided with means circularly adjusting it within the valve.

29. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder conduit, the ports for one conduit being staggered with respect to those of the adjacent conduit and means constituting a variable cut off for the steam on the inlet side and a uniform cut off for the steam on the outlet side, consisting of a hollow body within the valve and impervious to steam on the inlet side and free to receive and discharge it on the outlet side and provided with means circularly adjusting it within the valve.

30. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder conduit, in combination with a controller within the valve comprising a substantially flat diaphragm on the inlet side of less width than the diameter of the valve and an opening on the outlet side of greater width than any one of the valve ports.

31. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder spaced equally distant around the rotary valve, in combination with a controller within the valve comprising a substantially flat diaphragm on the inlet side of less width than the diameter of the valve and an opening on the outlet side of greater width than any one of the valve ports.

32. Two engine cylinders arranged side by side, a piston adapted to reciprocate in each cylinder, a common steam inlet and outlet conduit for each cylinder, a casing common to both cylinders intermediate said conduits and a source of steam supply, a rotary valve connected to and operated from a moving part of the engine and adapted to regulate both the admission and discharge of the steam simultaneously from both cylinders and provided with a plurality of ports for each cylinder conduit, the ports for one conduit being staggered with respect to those of the adjacent conduit, in combination with a controller within the valve comprising a substantially flat diaphragm on the inlet side of less width than the diameter of the valve and an opening on the outlet side of greater width than any one of the valve ports.

33. A steam engine comprising a cylinder, a piston reciprocating therein, a cylindrical valve connected to and operated by a moving part of the engine and which is adapted to regulate both the admission of the steam into and its discharge from the cylinder, and a controller arranged within the valve and provided with a diaphragm impervious to steam and of less width than the internal diameter of the valve.

34. A valve casing for a steam engine provided with inlet and outlet conduits for the steam, a cylindrical valve placed intermediate these conduits and adapted to rotate within the casing, a plurality of ports arranged along the valve parallel with its longitudinal axis, a seating surface for the body of the valve within the casing arranged below the horizontal diameter of the valve cylinder, and a clearance around the valve cylinder above said horizontal diameter.

35. A valve casing for a steam engine provided with inlet and outlet conduits for the steam, a cylindrical valve placed intermediate these conduits and adapted to rotate within the casing and a plurality of ports of an uneven number arranged along the valve parallel with its longitudinal axis, a seating surface for the body of the valve within the casing arranged below the horizontal diameter of the valve cylinder, and a clearance around the valve cylinder above said horizontal diameter.

36. A valve casing for a steam engine provided with inlet and outlet conduits for the steam, a cylindrical valve placed intermediate these conduits and adapted to move within the casing, a plurality of parts arranged along the valve parallel with its longitudinal axis and a seating surface for the body of the valve within the casing arranged below the horizontal diameter of the valve, in combination with a controller arranged within the valve impervious to the steam and of less width than the internal diameter of the valve.

37. A valve casing for a steam engine provided with inlet and outlet conduits for the steam, a cylindrical valve placed intermediate these conduits and adapted to move within the casing and a plurality of ports of an uneven number arranged along the valve parallel to its longitudinal axis and a seating surface for the body of the valve within the casing arranged below the horizontal diameter of the valve, in combination with a controller arranged within the valve impervious to the steam and of less width than the internal diameter of the valve.

38. A valve casing for a steam engine provided with inlet and outlet conduits for the steam, a cylindrical valve placed intermediate these conduits and adapted to rotate within the casing, an uneven number of ports arranged around the valve, each consisting of a longitudinal slit in the valve body, a seating surface within the casing for the valve body arranged below its horizontal diameter, and a clearance around the valve cylinder above said horizontal diameter.

39. A valve casing for a steam engine provided with inlet and outlet conduits for the steam, a cylindrical valve placed intermediate these conduits and adapted to move within the casing, an uneven number of ports arranged around the valve, each consisting of a longitudinal slit in the valve body and a seating surface within the casing for the valve body arranged below its horizontal diameter, in combination with a controller arranged within the valve impervious to the steam and of less width than the internal diameter of the valve.

40. A valve casing for a steam engine provided with inlet and outlet conduits for the steam, a cylindrical valve placed intermediate these conduits and adapted to move within the casing, a plurality of ports arranged along the valve parallel with its longitudinal axis and a seating surface for the body of the valve within the casing arranged below the horizontal diameter of the valve, in combination with a controller arranged within the valve impervious to the steam and of less width than the internal diameter of the valve on the inlet side of the valve and having a longitudinal inlet for the steam on its opposite side.

41. A valve casing for the steam engine provided with inlet and outlet conduits for the steam, a cylindrical valve placed intermediate these conduits and adapted to move within the casing, a plurality of ports arranged along the valve parallel with the longitudinal axis and a seating surface for the body of the valve within the casing arranged below the horizontal diameter of the valve, in combination with a controller arranged within the valve impervious to the steam and of less width than the internal diameter of the valve on the inlet side of the valve and having a longitudinal inlet for the steam on its opposite side of greater width than that of any of the valve ports.

42. A valve casing for a steam engine provided with inlet and outlet conduits for the steam, a cylindrical valve placed intermediate these conduits and adapted to move within the casing and a plurality of ports of an uneven number arranged along the valve parallel to its longitudinal axis and a seating surface for the body of the valve within the casing arranged below the horizontal diameter of the valve, in combination with a controller arranged within the valve impervious to the steam and of less width than the internal diameter of the valve, on the inlet side of the valve and having a longitudinal inlet for the steam on its opposite side.

43. A valve casing for a steam engine provided with inlet and outlet conduits for the steam, a cylindrical valve placed intermediate these conduits and adapted to move within the casing and a plurality of ports of an uneven number arranged along the valve parallel to its longitudinal axis and a seating surface for the body of the valve within the casing arranged below the horizontal diameter of the valve, in combination with a controller arranged within the valve impervious to the steam and of less width than the internal diameter of the valve, on the inlet side of the valve and having a longitudinal inlet for the steam on its opposite side, of greater width than that of any of the valve ports.

44. A valve casing for a steam engine provided with inlet and outlet conduits for the steam, a cylindrical valve placed intermediate these conduits and adapted to move within the casing, an uneven number of ports arranged around the valve, each consisting of a longitudinal slit in the valve body and a seating surface within the casing for the valve body arranged below its horizontal diameter, in combination with a controller arranged within the valve impervious to the steam and of less width than the internal diameter of the valve on the inlet side of the valve and having a longitudinal inlet for the steam on its opposite side.

45. A valve casing for a steam engine provided with inlet and outlet conduits for the steam, a cylindrical valve placed intermediate these conduits and adapted to move within the casing, an uneven number of ports arranged around the valve, each consisting of a longitudinal slit in the valve body and a seating surface within the casing for the valve body arranged below its horizontal diameter, in combination with a controller arranged within the valve impervious to the steam and of less width than the internal diameter of the valve on the inlet side of the valve and having a longitudinal inlet for the steam on its opposite side of greater width than that of any of the valve ports.

46. A steam engine comprising a cylinder, a piston reciprocating therein, a cylindrical valve connected to and operated by a moving part of the engine and which is adapted to regulate both the admission of the steam into and its discharge from the cylinder, and a controller arranged within the valve and provided with a diaphragm impervious to steam and of less width than the internal diameter of the valve on the inlet side of the valve and having a longitudinal inlet for the steam on its opposite side.

47. A steam engine comprising a cylinder, a piston reciprocating therein, a cylindrical valve connected to and operated by a moving part of the engine and which is adapted to regulate both the admission of the steam into and its discharge from the cylinder and which is provided with a plurality of ports of an uneven number and a controller arranged within the valve and provided with a diaphragm impervious to steam and of less width than the internal diameter of the valve.

48. A steam engine comprising a cylinder, a piston reciprocating therein, a cylindrical valve connected to and operated by a moving part of the engine and which is adapted to regulate both the admission of the steam into and its discharge from the cylinder and which is provided with a plurality of ports of an uneven number and a controller arranged within the valve and provided with a diaphragm impervious to steam and of less width than the internal diameter of the valve and of greater width than that of any of the valve ports.

49. A rotary valve for a steam engine adapted to govern the entrance and exit of steam from the same and a cut off arranged within the valve whereby the steam enters the interior of the valve on one side of the cut off and leaves it on the other.

50. A rotary valve for a steam engine adapted to govern the entrance and exit of steam from the same and a cut off arranged within the valve whereby the steam enters the interior of the valve on one side of the cut off and leaves it on the other and the steam is fed to and exhausted from the engine during one rotation of the valve as many times as it has ports.

51. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, in combination with a plurality of seating surfaces with which the valve is in contact during its rotation and each one of which is below the center of the valve.

52. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, the ports for each conduit being arranged in a series and spaced equidistant around the cylinder, in combination with a plurality of seating surfaces with which the valve is in contact during its rotation and each one of which is below the center of the valve.

53. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, the ports for one conduit being staggered with respect to those of the adjacent conduit, in combination with a plurality of seating surfaces with which the valve is in contact during its rotation and each one of which is below the center of the valve.

54. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, in combination with a plurality of seating surfaces with which the valve is in contact during its rotation and each one of which is below the center of the valve and an internal controller adapted to throttle the ports on the inside of the valve.

55. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, the ports for each conduit being arranged in a series and spaced equidistant around the cylinder, in combination with a plurality of seating surfaces with which the valve is in contact during its rotation and each one of which is below the center of the valve and an internal controller adapted to throttle the ports on the inside of the valve.

56. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, the ports for one conduit being staggered with respect to those of the adjacent conduit, in combination with a plurality of seating surfaces with which the valve is in contact during its rotation and each one of which is below the center of the valve, in combination with a plurality of seating surfaces with which the valve is in contact during its rotation and each one of which is below the center of the valve.

57. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, in combination with a plurality of seating surfaces with which the valve is in contact during its rotation and each one of which is below the center of the valve and an internal controller adapted to throttle the ports on the inside of the valve, comprising a substantially flat diaphragm on the inlet side of less width than the diameter of the valve and an opening on the outlet side of greater width than any one of the valve ports.

58. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, the ports for each conduit being arranged in a series and spaced equidistant around the cylinder, in combination with a plurality of seating surfaces with which the valve is in contact during its rotation and each one of which is below the center of the valve and an internal controller adapted to throttle the ports on the inside of the valve, comprising a substantially flat diaphragm on the inlet side of less width than the diameter of the valve and an opening on the outlet side of greater width than any one of the valve ports.

59. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, the ports for one conduit being staggered with respect to those of the adjacent conduit, in combination with a plurality of seating surfaces with which the valve is in contact during its rotation and each one of which is below the center of the valve, and a controller within the valve comprising a substantially flat diaphragm on the inlet side of less width than the diameter of the valve and an opening on the outlet side of greater width than any one of the valve ports.

60. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, in combination with a plurality of seating surfaces with which the valve is in contact during its rotation and each one of which is below the center of the valve and an internal controller comprising a substantially flat diaphragm adapted to throttle the ports on the inside of the valve and external means for adjusting the controller.

61. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, the ports for each conduit being arranged in a series and spaced equidistant around the cylinder, in combination with a plurality of seating surfaces with which the valve is in contact during its rotation and each one of which is below the center of the valve and an internal controller comprising a substantially flat diaphragm adapted to throttle the ports on the inside of the valve and external means for adjusting the controller.

62. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, the ports for one conduit being staggered with respect to those of the adjacent conduit, in combination with a plurality of seating surfaces with which the valve is in contact during its rotation and each one of which is below the center of the valve and external means for adjusting the controller.

63. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, in combination with a plurality of seating surfaces with which the valve is in contact during its rotation and each one of which is below the center of the valve and an internal controller adapted to throttle the ports on the inside of the valve, comprising a substantially flat diaphragm on the inlet side of less width than the diameter of the valve and an opening on the outlet side of greater width than any one of the valve ports and external means for adjusting the controller.

64. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, the ports for each conduit being arranged in a series and spaced equidistant around the cylinder, in combination with a plurality of seating surfaces with which the valve is in contact during its rotation and each one of which is below the center of the valve and an internal controller adapted to throttle the ports on the inside of the valve, comprising a substantially flat diaphragm on the inlet side of less width than the diameter of the valve and an opening on the outlet side of greater width than any one of the valve ports and external means for adjusting the controller.

65. A rotary valve for a steam engine adapted to govern the entrance and exit of the steam from conduits leading to a plurality of adjacent cylinders and comprising a cylindrical body provided with a plurality of longitudinal ports adapted to coöperate with each conduit, the ports for one conduit being staggered with respect to those of the adjacent conduit, in combination with a plurality of seating surfaces with which the valve is in contact during its rotation and each one of which is below the center of the valve and a controller within the valve comprising a substantially flat diaphragm on the inlet side of less width than the diameter of the valve and an opening on the outlet side of greater width than any one of the valve ports, and external means for adjusting the controller.

66. A rotary valve provided with a plurality of ports of an uneven number, and spaced equidistant around the body of the valve, a casing in which the valve is adapted to be rotated, and an aperture on one side of the casing through which the steam is admitted to and discharged from an engine, the width of said aperture measured around the body of the valve being substantially equal to the distance between any two ports on the valve similarly measured.

67. A rotary valve provided with a plurality of ports of an uneven number, and spaced equidistant around the body of the valve, a casing in which the valve is adapted to be rotated and an aperture on one side of the casing through which the steam is admitted to and discharged from an engine, the width of said aperture measured around the body of the valve being substantially equal to the distance between any two ports on the valve similarly measured, in combination with a controller within the valve of less diameter than the valve.

68. A rotary valve provided with a plurality of ports of an uneven number, and spaced equidistant around the body of the valve, a casing in which the valve is adapted to be rotated and an aperture on one side of the casing through which the steam is admitted to and discharged from an engine, the width of said aperture measured around the body of the valve being substantially equal to the distance between any two ports on the valve similarly measured, in combination with a controller within the valve of less diameter than the valve and arranged on one side of such diameter.

69. A rotary valve provided with a plurality of ports of an uneven number, and spaced equidistant around the body of the valve, a casing in which the valve is adapted to be rotated, and an aperture on one side of the casing through which the steam is admitted to and discharged from an engine, the width of said aperture measured around the body of the valve being substantially equal to the distance between any two ports on the valve similarly measured, in combination with a controller having a diaphragm impervious to steam and of less diameter than that of the valve and a steam inlet on its opposite side of greater width than any one of the valve ports.

70. A rotary valve provided with a plurality of ports of an uneven number and spaced equidistant around the body of the valve, a casing in which the valve is adapted to be rotated, and an aperture on one side of the casing through which the steam is admitted to and discharged from an engine the width of said aperture measured around the body of the valve being substantially equal to the distance between any two ports on the valve similarly measured, in combination with a controller having a diaphragm impervious to steam and of less diameter than that of the valve and a steam inlet on its opposite side of greater width than any one of the valve ports but of less width than the width of the aperture in the casing.

71. A rotary valve provided with a plurality of ports of an uneven number, and spaced equidistant around the body of the valve, a casing in which the valve is adapted to be rotated, and an aperture on one side of the casing through which the steam is admitted to and discharged from an engine the width of said aperture measured around the body of the valve being substantially equal to the distance between any two ports on the valve similarly measured, in combination with a controller having a diaphragm impervious to steam and of less diameter than that of the valve and a steam inlet on its opposite side of greater width than any one of the valve ports and external means for circularly adjusting the position of the controller within the valve.

72. A rotary valve provided with a plurality of ports of an uneven number, and spaced equidistant around the body of the valve, a casing in which the valve is adapted to be rotated, and an aperture on one side of the casing through which the steam is admitted to and discharged from an engine, the width of said aperture measured around the body of the valve being substantially equal to the distance between any two ports on the valve similarly measured, in combination with a controller having a diaphragm impervious to steam and of less diameter than that of the valve and a steam inlet on its opposite side of greater width than any one of the valve ports and external means for circularly adjusting the position of the controller within the valve.

73. A rotary valve for a steam engine adapted to govern the entrance and exit of the steam from a conduit leading to an adjacent cylinder and comprising a cylindrical body provided with ports adapted to coöperate with the conduit, in combination with a controller within the cylindrical valve, to throttle the ports on the inside of the valve, said controller being of less width than the diameter of the valve whereby the valve is divided into a chamber communicating with the inlet conduit, and a second chamber on the opposite side of the controller communicating with the outlet conduit, the last named chamber being of less cross sectional area than the former.

74. A rotary valve for a steam engine, adapted to govern the entrance and exit of the steam from conduits leading to a plurality of adjacent cylinders, and comprising a cylindrical body provided with a plurality of ports adapted to coöperate with each conduit, in combination with a controller within the cylindrical valve to throttle the ports on the inside of the valve, said controller being of less width than the diameter of the valve, whereby the valve is divided into a chamber communicating with the inlet conduits, and a second chamber on the opposite side of the controller communicating with the outlet conduits, the last named chamber being of less cross sectional area than the former.

75. A valve casing for a steam engine provided with inlet and outlet conduits for the steam, a cylindrical valve placed intermediate these conduits and adapted to rotate within the casing and a seating surface within the casing for the valve body of less than half the circumference of the interior of the casing, a chamber being provided in the casing around the unseated portion of the valve communicating with the steam inlet whereby the valve is held in its seat by the pressure of the incoming steam, in combination with a controller within the cylindrical valve to throttle the ports on the inside of the valve, said controller being of less width than the diameter of the valve, whereby the valve is divided into a chamber communicating with the inlet conduit and a second chamber on the opposite side of the controller communicating with the outlet conduit, the last named chamber being of less cross sectional area than the former.

76. A valve casing for a steam engine provided with an inlet, and a plurality of outlet conduits for the steam, a cylindrical valve placed intermediate the inlet and outlet conduits and adapted to rotate within the casing, a plurality of ports arranged around the valve, communicating with the inlet conduit, a plurality of adjacent cylinders communicating with the outlet conduits of the casing, and a seating surface within the casing of less than half the circumference of the interior of the casing, a chamber being provided in the casing around the unseated portion of the valve communicating with the steam inlet, whereby the valve is held in its seat by the pressure of the incoming steam, in combination with a controller within the cylindrical valve to throttle the ports on the inside of the valve, said controller being of less width than the diameter of the valve whereby the valve is divided into a chamber communicating with the inlet conduits, and a second chamber on the opposite side of the controller communicating with the outlet conduits, the last named chamber being of less cross sectional area than the former.

Witness my hand this 29th day of April 1909, at New York, N. Y.

JOSEPH ROTHCHILD.

Witnesses:
MAY HUGHES,
ALAN C. McDONNELL.